US012277560B2

(12) United States Patent
Sharma

(10) Patent No.: US 12,277,560 B2
(45) Date of Patent: Apr. 15, 2025

(54) SPECULATIVE TRANSACTION OPERATIONS FOR RECOGNIZED DEVICES

(71) Applicant: PayPal, Inc., San Jose, CA (US)

(72) Inventor: Sanjeev Sharma, Georgetown, TX (US)

(73) Assignee: PayPal, Inc., San Jose, CA (US)

( * ) Notice: Subject to any disclaimer, the term of this patent is extended or adjusted under 35 U.S.C. 154(b) by 127 days.

(21) Appl. No.: 17/563,250

(22) Filed: Dec. 28, 2021

(65) Prior Publication Data

US 2022/0122074 A1  Apr. 21, 2022

Related U.S. Application Data

(63) Continuation of application No. 16/130,024, filed on Sep. 13, 2018, now Pat. No. 11,301,853.

(51) Int. Cl.
*G06Q 20/40* (2012.01)
*G06Q 20/20* (2012.01)
(Continued)

(52) U.S. Cl.
CPC ......... *G06Q 20/401* (2013.01); *G06Q 20/204* (2013.01); *G06Q 20/3227* (2013.01);
(Continued)

(58) Field of Classification Search
CPC ............. G06Q 20/401; G06Q 20/3227; G06Q 20/4014; G06Q 20/4016
See application file for complete search history.

(56) References Cited

U.S. PATENT DOCUMENTS 6,430,539 B1  8/2002 Lazarus et al.
6,577,861 B2  6/2003 Ogasawara
(Continued)

FOREIGN PATENT DOCUMENTS

CN  105027152 A  11/2015
CN  105229683 A  1/2016
(Continued)

OTHER PUBLICATIONS

Rouse, "https://www.techopedia.com/definition/3553/cache", Mar. 14, 2017.*
(Continued)

*Primary Examiner* — Steven S Kim
(74) *Attorney, Agent, or Firm* — Kowert, Hood, Munyon, Rankin & Goetzel, P.C.

(57) ABSTRACT

Techniques are disclosed relating to speculatively processing transactions. A transaction processing system may receive an indication of a trigger event associated with an electronic transaction not yet initiated by a client computing device. In some embodiments, in response to the indication of the trigger event and prior to receiving an indication of the electronic transaction being initiated, the computer system begins speculative processing of the electronic transaction. In some embodiments, the speculative processing includes identifying the client computing device based on device authentication information received from the client device, determining a user account based on the identifier client computing device, retrieving account information for the determined account, and storing the retrieved account information. In response to receiving an indication of the electronic transaction being initiated, in some embodiments, the computer system performs one or more operations using the stored account information to complete the transaction.

20 Claims, 11 Drawing Sheets

(51) Int. Cl.
   *G06Q 20/32* (2012.01)
   *G06Q 20/42* (2012.01)
(52) U.S. Cl.
   CPC ..... *G06Q 20/4014* (2013.01); *G06Q 20/4016* (2013.01); *G06Q 20/42* (2013.01)

(56) References Cited

U.S. PATENT DOCUMENTS

| | | | |
|---|---|---|---|
| 9,355,155 | B1 | 5/2016 | Cassel et al. |
| 10,013,267 | B1 | 7/2018 | Wagner et al. |
| 10,255,300 | B1* | 4/2019 | Jhingran .................. G06F 16/21 |
| 11,093,887 | B2* | 8/2021 | Aoki ..................... G06Q 10/083 |
| 11,210,716 | B2* | 12/2021 | Abbasi Moghaddam ................... G06Q 30/0609 |
| 11,301,853 | B2* | 4/2022 | Sharma .................. G06Q 20/42 |
| 2003/0177361 | A1 | 9/2003 | Wheeler et al. |
| 2004/0068446 | A1 | 4/2004 | Do et al. |
| 2005/0097320 | A1 | 5/2005 | Golan et al. |
| 2008/0275748 | A1* | 11/2008 | John .................. G06Q 20/4012 705/26.1 |
| 2010/0121767 | A1 | 5/2010 | Coulter et al. |
| 2010/0280880 | A1* | 11/2010 | Faith .................. G06Q 30/0269 709/206 |
| 2011/0320291 | A1 | 12/2011 | Coon |
| 2012/0089521 | A1 | 4/2012 | Abrevaya et al. |
| 2013/0144888 | A1* | 6/2013 | Faith ..................... G06F 16/338 707/755 |
| 2014/0129441 | A1 | 5/2014 | Blanco et al. |
| 2014/0229375 | A1 | 8/2014 | Zaytzsev et al. |
| 2014/0317266 | A1* | 10/2014 | Fuchs .................... G06Q 30/02 709/224 |
| 2015/0379514 | A1 | 12/2015 | Poole |
| 2016/0063493 | A1* | 3/2016 | Howe .................. G06Q 20/322 705/44 |
| 2016/0189150 | A1* | 6/2016 | Ahuja ............. G06Q 20/40145 705/44 |
| 2016/0239867 | A1* | 8/2016 | Sinha .................. G06Q 30/0257 |
| 2016/0260081 | A1 | 9/2016 | Zermeño |
| 2016/0321643 | A1* | 11/2016 | Beck ....................... G06Q 20/34 |
| 2017/0289188 | A1* | 10/2017 | Shaikh ................ H04L 63/1425 |
| 2017/0357976 | A1* | 12/2017 | Malik .................. H04L 63/0807 |
| 2017/0364930 | A1* | 12/2017 | Kannan .............. G06Q 30/0269 |
| 2018/0014200 | A1 | 1/2018 | Myers et al. |
| 2018/0025397 | A1* | 1/2018 | Kuruvila ................. G06Q 30/04 705/40 |
| 2018/0181963 | A1 | 6/2018 | Birukov et al. |
| 2018/0322394 | A1* | 11/2018 | Nguyen ................. G06N 20/00 |

FOREIGN PATENT DOCUMENTS

| | | |
|---|---|---|
| CN | 105830104 A | 8/2016 |
| CN | 105874495 A | 8/2016 |
| CN | 108369700 A | 8/2018 |

OTHER PUBLICATIONS

Extended European Search Report for Application No. 19860002.5 mailed on May 6, 2022, 7 pages.

Bajaj K., et al., "Your phone's fingerprint scanner can do much more than just unlock your phone! Here's how", The Economic Times, Retrieved from Internet URL: https://economictimes.indiatimes.com/magazines/panache/your-phones-fingerprint-scanner-can-do-much-more-than-just-unlock-your-phone-heres-how/articleshow/57766012.cms, Mar. 22, 2017, 3 pages.

Bojinov H., et al., "Mobile Device Identification via Sensor Fingerprinting", published in ArXiv, arXiv:1408.1416 [cs.CR], Aug. 6, 2014, 14 pages.

"Electronic Banking", Federal Trade Commission Consumer Information, Aug. 2012, Retrieved from the Internet: URL: https://www.consumer.ftc.gov/articles/0218-electronic-banking, Jul. 19, 2018, 7 Pages.

International Appl. No. PCT/US2019/50817, International Search Report and Written opinion mailed Dec. 2, 2019, 7 pages.

International Application No. PCT/US2019/050817, International Preliminary Report on Patentability mailed on Mar. 25, 2021, 6 pages.

* cited by examiner

SPECULATIVE TRANSACTION OPERATIONS FOR RECOGNIZED DEVICES

CROSS REFERENCE TO RELATED APPLICATIONS

The present application is a continuation application of U.S. patent application Ser. No. 16/130,024, filed Sep. 13, 2018, and is incorporated in reference in its entirety.

BACKGROUND

Technical Field

This disclosure relates generally to processing electronic computer transactions and more specifically to speculatively performing operations for electronic transactions initiated by recognized devices.

Description of the Related Art

Computers are used for a large number of electronic transactions of various types. Examples of electronic transactions include security transactions (e.g., exchanging private keys), communications transactions, purchase transactions, payment transactions, etc. Transactions may include a number of operations, such as authentication, authorization, auxiliary tasks, and various data communications. Thus, users may often be forced to wait for one or more portions of a transaction before proceeding. Speaking generally, improving transaction performance may improve user experience. Further, reducing the time used to perform specific transaction operations may allow additional time for other operations, which may allow for improved functionality for the other operations.

Figure 1:
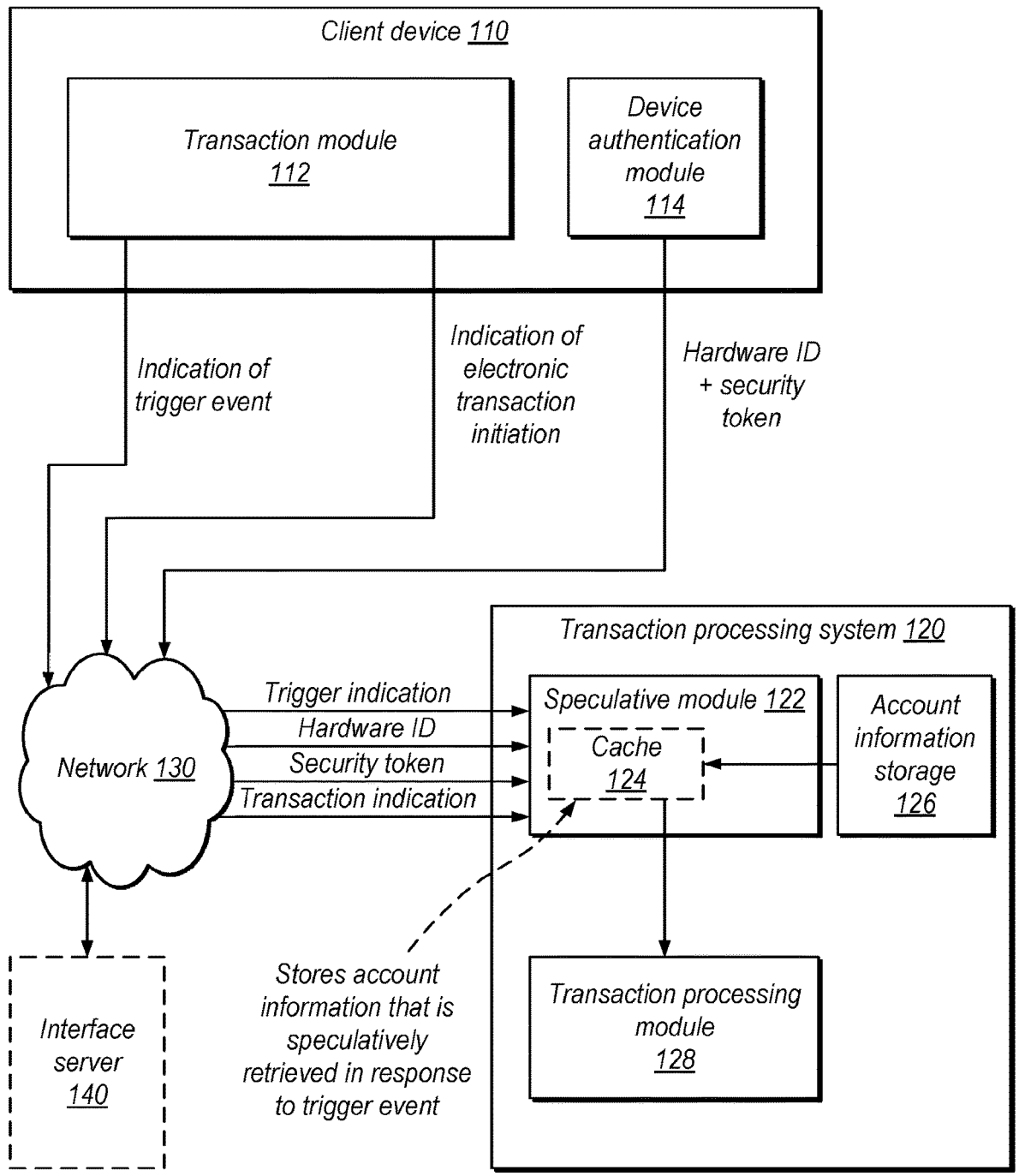
FIG. 1 is a block diagram illustrating an exemplary transaction processing system configured to speculatively perform operations for an electronic transaction in response to an indication of a trigger event, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "transaction processing system configured to speculatively retrieve and store account information" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for speculatively retrieving and storing user account information for a recognized user device and using the retrieved account information to process one or more transactions for the user account. In some embodiments, a transaction processing system receives an indication from a recognized client device that a trigger event will be provided to the user of the client device. For example, the trigger event may be display of a user interface element selectable by the user of the client device such as a "Pay with PayPal" element. In some embodiments, the transaction processing system begins speculatively processing the transaction in response to the indication that the element will be presented to the user and prior to the user selecting the element. Speculative processing of one or more transactions may advantageously improve the overall performance of the transaction processing system. For example, speculative processing may decrease processing time and/or increase overall security for one or more transactions. Thus, in some embodiments, the techniques disclosed herein allow for the following operations: (1) a user navigates to a web page that allows for one or more purchasing options (e.g. credit card, PayPal™ payment, etc.); (2) scripting code on the web page recognizes that the user may be about to make a purchase for a particular amount such as $50 of merchandise that is already in a shopping cart; (3) the web page makes a pre-emptive call to a payment service such as that provided by PayPal™, where the pre-emptive call includes some uniquely identified user information as may be associated with the PayPal OneTouch service; and (4) a payment server begins to speculatively process a payment request, using the unique user information, before the request is initiated by the user. This may allow for faster processing if and when the user actually initiates the payment request, as some or all of the payment request may be pre-approved (which can reduce the latency, for example, between the initiation of the user request and its ultimate approval).

In some embodiments, the system is configured to determine whether to perform speculative processing for a transaction. For example, the system may perform speculative processing based on predicting whether the user of the client device will select the element that initiates processing of the transaction (that is, it may be possible to predict a likelihood of whether the user will select a particular transaction processing option, and decide whether to speculatively execute based on this likelihood). Similarly, the system may determine to perform speculative processing or not based on system congestion, for example. In some embodiments, speculative processing is performed based on a determined priority for one or more transactions, and the priority may be determined based on the prediction information. The system may determine various parameters for a transaction based on whether the transaction is being speculatively processed and/or based on the priority of the transaction.

In some embodiments, the speculative operations may be based in part on automatic recognition of a user device. For example, PayPal's One Touch technology provides passwordless authentication (e.g., the user is not required to enter a password). In some embodiments, the One Touch procedure uses device authentication information (e.g., a hardware identifier and/or a security token) to identify an account for retrieval of account information for a transaction, without requiring the user to enter a username or password. Therefore, speculative processing may include retrieving account information for an account identified based on device authentication information. Additional details regarding One Touch techniques are described in U.S. Patent Application Publication No. US2017/0357976A1.

Overview of Speculative Operations for Transaction Processing

FIG. 1 is a block diagram illustrating an exemplary transaction processing system configured to speculatively perform operations for an electronic transaction in response to an indication of a trigger event, according to some embodiments. In the illustrated embodiment, transaction processing system 120, client device 110, and interface server 140 communicate via network 130. Network 130 may be implemented using one or more of various technologies and may include Internet communications, for example.

Client device 110, in the illustrated embodiment, is a computing device that is configured to initiate transactions for a user. For example, client device 110 may be a mobile device, wearable device, desktop computer, internet-of-things device, etc. Client device 110 may display a user interface in various contexts, e.g., within a web browser, within a web application, within an application installed on device 110, etc. In some embodiments, information for the user interface is provided by another device, e.g., the transaction processing system or a third-party device such as interface server 140. For example, interface server 140 may be a web server that provides interface information for a website or web application. As one particular example, interface server 140 may be implemented by a merchant for a purchase transaction, for which payment is handled by transaction processing system 120.

Transaction module 112 of client device 110, in the illustrated embodiment, is configured to send an indication of a trigger event to speculative module 122 of transaction processing system 120 via network 130. Speculative module 122, discussed in further detail below, may speculatively perform one or more operations in response to the trigger indication.

In some embodiments, the trigger event may be one or more of the following actions performed by a user of the user account on client device 110: display of an interface element (e.g. a graphic icon) that is selectable by the user to initiate a transaction using transaction processing system 120, selection of an item (e.g., placing an item in a cart for purchase), electronic communications (e.g., audio or text-based) with a service representative (e.g., of a service provider that operates transaction processing system 120 and/or a merchant that operates interface server 140), viewing one or more particular interfaces (e.g., web pages or application views such as a shopping cart), user selection of a particular displayed interface element, etc.

Device authentication module 114 of client device 110, in the illustrated embodiment, sends a hardware identifier (ID) and a security token associated with device 110 to the speculative module 122 via network 130. In some embodiments, the ID and token are sent to module 122 with (e.g., at the same time as) the indication of the trigger event. In some embodiments, transaction processing system 120 may request this information in response to the indication of the trigger event.

In some embodiments, in response to receiving the hardware ID and security token, speculative module 122, included in transaction processing system 120, is configured to identify a user account associated with the ID and token. In the illustrated embodiment, after identifying the user account and prior to the user account performing the trigger event, speculative module 122 accesses account information storage 126 to retrieve information associated with the identified user account. In the illustrated embodiment, the retrieved account information is speculatively stored in cache 124.

In some embodiments, the account information stored in cache 124 is stored based on a determined priority of one or more transactions. For example, account information may be less likely to be retained in cache 124 if the information is associated with a low priority transaction (e.g., lower priority compared to other transactions with information stored in the cache). In some embodiments, one or more portions of transactions are speculatively processed based on priority. For example, transactions with a higher priority level compared to other transactions may be speculatively processed before other transactions with lower priority. In some embodiments, cache 124 stores account information for transactions intended to be processed both speculatively and non-speculatively. In other embodiments, cache 124 stores transactions only for speculatively performed transactions.

In some embodiments, transaction processing system 120 is configured to speculatively perform various different procedures for transactions based on the account information stored in cache 124. Although device authentication information such as a hardware ID and security token, and account retrieval for a recognized device are discussed herein for purposes of explanation, these techniques may not be used in other embodiments of speculative transaction processing. For example, other techniques may be used to identify a user account and any of various operations may be speculatively performed for the identified account. Further, some types of speculative operations may be performed without identifying a user account. The specific example of FIG. 1 is included to facilitate explanation, but is not intended to limit the scope of the present disclosure.

In the illustrated embodiment, in response to initiation of the transaction (e.g., the user actually selecting a user interface element to perform a transaction using transaction processing system 120), client device 110 sends an indication that the electronic transaction has been initiated to transaction processing system 120 via network 130. In the illustrated embodiment, in response to receiving the indication that the electronic transaction has been initiated speculative module 122 sends the speculatively retrieved and cached account information to transaction processing module 128.

Transaction processing module 128 may authorize the initiated transaction based on the information received from speculative module 122, e.g., based on the speculative processing performed for the transaction. In some embodiments, transaction processing module 128 communicates with client device 110 via network 130 to request confirmation/approval from the user of device 110 for the authorized transaction before completing the transaction. In some embodiments, once transaction processing module 128 has authorized the electronic transaction, it sends a confirmation to client device 110. Note that various elements shown in FIG. 1, such as transaction processing system 120, may be implemented as a single device or using multiple devices (e.g., multiple servers in communication).

Interface server 140, in some embodiments, may generate user interface information for client device 110 (e.g., for a website or web application). Interface server 140 may be an application server, database server, web server, virtual server, etc. In some embodiments, for various information in FIG. 1 (e.g., the indication of the trigger, the indication of transaction initiation, device authentication information, etc.) interface server 140 may act as an intermediary between client device 110 and transaction processing system 120 (e.g., may receive information from client device 110 and forward it to transaction processing system 120 or vice versa). In some embodiments, even when interface server 140 is communicating with client device 110, client device 110 may also communicate some information directly with transaction processing system 120.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

As used herein, "speculatively" performing one or more actions is intended to be construed according to its well understood meaning, which includes performing one or more operations that may or may not actually be needed. For example, speculatively processing a transaction may include performing one or more operations needed for authorization of the transaction before it is known whether the transaction will actually be initiated. Typically, speculative processing is performed for one or more portions of authorization. However, speculative processing may be performed for all portions of a transaction prior to initiation of the transaction, e.g., such that the transaction can be completed immediately upon initiation of the transaction. Note that the "transaction" for this speculative processing is performed may be a portion of another transaction. For example, the speculative processing may be performed for a payment transaction that is part of a purchase transaction.

Example Transaction Flow Involving Speculative Execution

Figure 2:
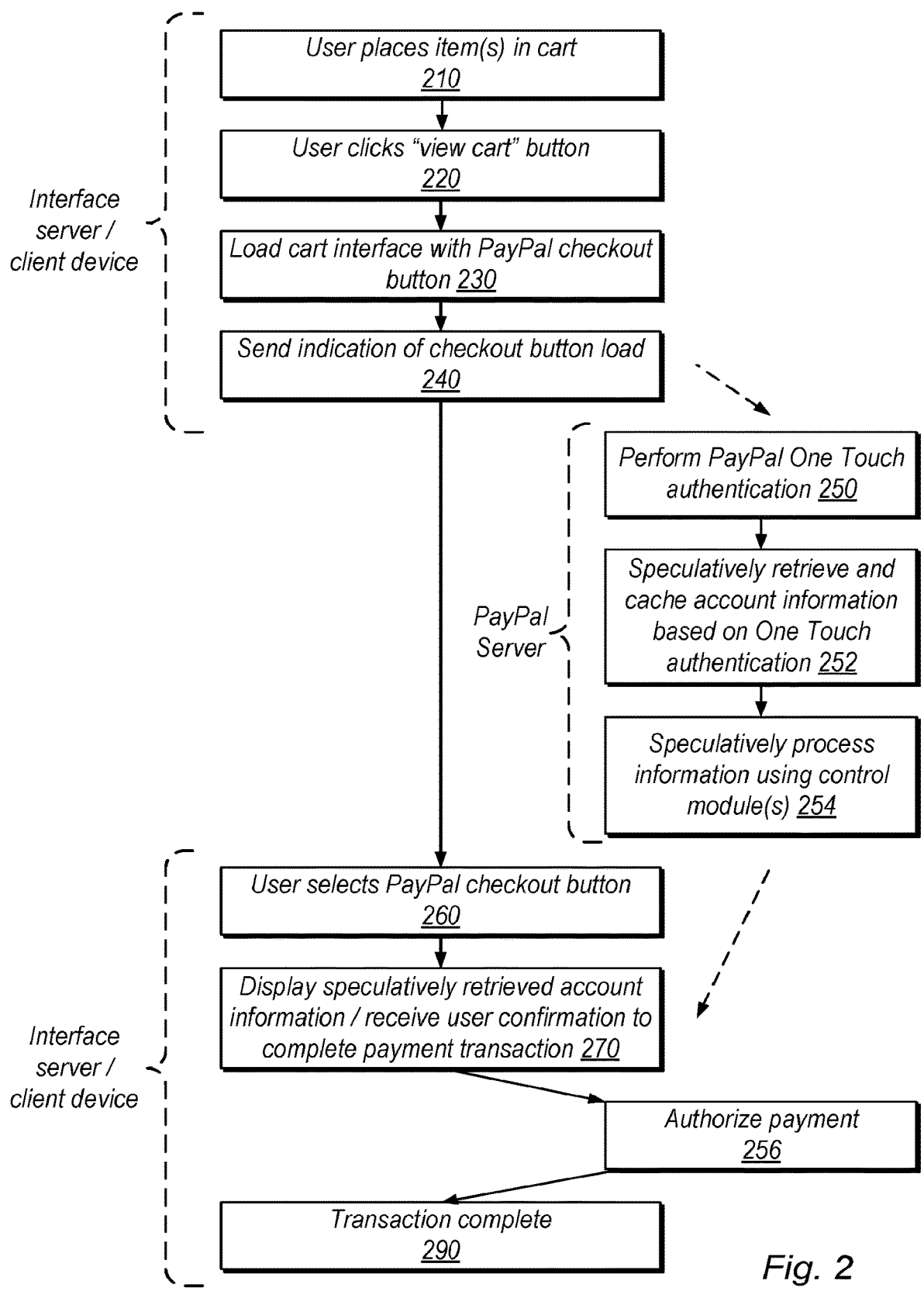
FIG. 2 is a flow diagram illustrating a detailed example of speculative transaction processing, according to some embodiments.

FIG. 2 is a flow diagram illustrating a detailed example of speculative transaction processing, according to some embodiments. In this particular example, a PayPal transaction server supports One Touch authentication. The illustrated example is one non-limiting example of speculative transaction processing (i.e., other embodiments are contemplated). In the illustrated embodiment, elements 210-240 and 260-290 are performed by interface server 140 and/or client device 110, while elements 250-256 are performed by a PayPal transaction processing system.

At 210, in the illustrated embodiment, a user of client device 110 places one or more items into an electronic shopping cart. In some embodiments, information for the cart is displayed in one or more user interfaces, e.g., the exemplary interface of FIG. 7. At 220, in the illustrated embodiment, at 220, the user selects a "view cart" button displayed on the client device. Non-limiting examples of user selection of a user interface element include clicking using a mouse, saying a verbal command, or touching using a touchscreen. Note that the term "button" is used herein for convenience to describe an example user interface element, but this term is not intended to limit the types of interface elements implemented in various embodiments.

At 230, in the illustrated embodiment, the client device loads a cart interface that includes pay with PayPal checkout button. In the illustrated embodiment, at 240, the client device sends an indication that the checkout button is being loaded to the PayPal server (note that this indication may be sent before or after the button has actually been displayed). In the example context of a PayPal transaction, the indication may be sent in conjunction with processing a "paypal-.button.render" component. In some embodiments, program code of a web application or website requests information from the PayPal server (e.g., to retrieve the most recent logo for the button to pay with PayPal). In some embodiments, this request may be used to trigger speculative processing.

At 250, in the illustrated embodiment, the PayPal server performs One Touch authentication of the user account based on authentication information from the client computing device. In some embodiments, One Touch authentication authenticates a user without requiring the user to explicitly enter authentication credentials (e.g., without requiring a username or password). In some embodiments, the client device provides a hardware identifier and a security token (e.g., a browser cookie) to the PayPal server. In some embodiments, the PayPal server uses this authentication information to identify a user account for the transaction. The PayPal server may also verify that the security token is the correct token for the identified hardware.

At 252, in the illustrated embodiment, the PayPal server speculatively retrieves and caches account information based on the account identified using the One Touch procedure. The account information may include account identification information, information for saved payment instruments, information about one or more users associated with the account, historical information for past transactions using the account, etc. In some embodiments, speculatively retrieving account information may advantageously reduce the time interval between user selection of the PayPal checkout button and display of account information to move forward with the payment, relative to techniques that identify a user account subsequent to user selection of the button. Note that in various embodiments, results for speculatively executing all or a portion of a transaction may be retained (e.g. in a cache) for a limited amount of time, such as 30 seconds, 5-10 minutes, or some other period of time. The results may be discarded after a predetermined amount of time because underlying account and financial information may change between the time a transaction is speculatively executed and actually initiated by a user, and the longer between these two events, the greater chance the speculative execution results may no longer be accurate or fully reflective of risk involved in processing the transaction.

At 254, in the illustrated embodiment, at 254, the PayPal server speculatively processes information using one or more control modules. The control modules may be are used to perform or control various speculative procedures for transactions, as discussed in further detail below with reference to FIGS. 3-5. Performing these operations speculatively may advantageously reduce overall transaction time and/or improve the quality of the transaction processing (e.g., by taking more time for an operation performed by a control module than would be acceptable after user selection of the button).

At 260, in the illustrated embodiment, the user of client device 110 selects the pay with PayPal checkout button. At 270, in the illustrated embodiment, based on the user clicking the checkout button, the client device displays speculatively retrieved account information to the user of the client device. An example interface for displaying this information and providing the user with the option to complete the payment transaction is discussed below with reference to FIG. 8. In the illustrated embodiment, the client device receives user confirmation to complete the payment transaction based on displaying the speculatively retrieved account information.

At 256, in the illustrated embodiment, the PayPal system authorizes payment for the transaction after receiving an indication of the confirmation from the user of the client device. At 290, in the illustrated embodiment, the client device displays a confirmation message (e.g., as discussed below with reference to FIG. 9) to the user of the client device once the transaction is complete and payment has been authorized.

Example Control Modules

Figure 3:
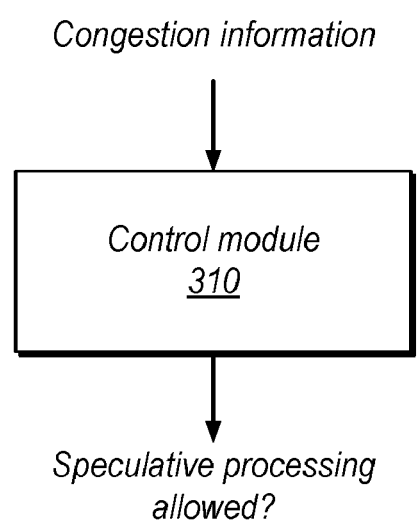
FIG. 3 is a block diagram illustrating an exemplary control module configured to determine whether speculative processing of transactions is allowed, according to some embodiments.

FIG. 3 is a block diagram illustrating an exemplary control module configured to determine whether speculative processing of transactions is allowed, according to some embodiments. In the illustrated embodiment, control module 310 receives congestion information and indications whether speculative processing is allowed based on the congestion information. For example, control module 310 may not allow speculative processing where there is a large amount of congestion in the system, to avoid taking system resources for transactions that may not actually occur. The congestion information may be based on one or more of: utilized bandwidth on certain links, processing resources being used, determined latency, number of available cache entries, etc. Speculative module 122 may operate based on the output from control module 310.

Note that various other types of inputs may be used to determine whether to speculatively process and/or the how to perform operations speculatively. The inputs discussed above and below are included for purposes of illustration, but are not intended to limit the scope of the present disclosure. In some embodiments, speculative processing is based at least in part on parameters received from a client device or intermediate server.

Figure 4:
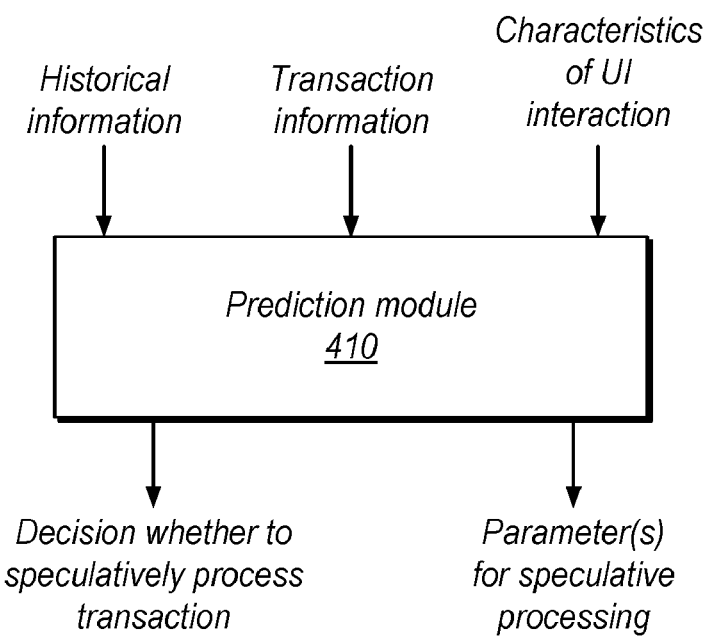
FIG. 4 is a block diagram illustrating an exemplary control module configured to predict whether a transaction will be executed and determine whether and speculative processing should be performed for the transaction and/or parameters for the speculative processing, according to some embodiments.

FIG. 4 is a block diagram illustrating an exemplary control module configured to predict whether a transaction will be executed and determine (A) whether speculative processing should be performed for the transaction and/or (B) parameters for the speculative processing, according to some embodiments. In the illustrated embodiment, prediction module 410 is configured to predict whether a transaction will occur based on three types of input information:

historical information, transaction information, and user interface interaction characteristics.

Historical information may include, for example, information for previous transactions by the user account. In some embodiments, the historical information is retrieved from account information storage 126. For example, the historical information may indicate, for a number of prior situations where a PayPal checkout option was provided to the account user, the number of times (or the ratio of times) that the user actually selected the option. For example, it may be less desirable to speculatively process a transaction for users that rarely checkout with PayPal. The historical information may also include indicate without limitation: average number of items involved in electronic transactions, average prices of items in electronic transactions, number of transactions per month, etc.

Transaction information may include, for example: transaction amount, time of day, quantity of items, type of items, type of payment recipient (e.g., merchant or individual account), identity of payment recipient, type of transaction (which may include non-payment transactions), etc. In some embodiments, prediction module 410 may also utilize user account information (e.g., demographics, location, etc.) to predict whether a transaction will be initiated.

Characteristics of user interface interaction may indicate, for example: amount of time spent viewing certain pages, scrolling or selection activity via the interface, number of pages viewed, duration of intervals with no interaction, etc. In embodiments with multiple potential triggers for speculative processing, the prediction of whether the transaction will actually occur may be based at least in part on the type of trigger. For example, a user adding an item to a cart may be less likely to result in a transaction than loading of the PayPal Checkout user interface element.

In the illustrated embodiment, prediction module 410 generates a prediction of whether the transaction will actually occur (e.g., whether the user will actually select a PayPal checkout interface element). Based on this prediction, in the illustrated embodiment, prediction module 410 is configured to determine whether to speculatively process the transaction and/or one more parameters for the processing.

One example parameter for speculative processing is a priority level for the transaction. This priority level may be used to determine queuing priority for the transaction or cache retention priority for information retrieved for the transaction, for example. Other examples of parameters include a parameter that indicates what operations to speculatively perform, which of several available modules to use for the speculative operations, input parameters to specific modules to affect their functionality for speculative processing, etc.

Figure 5:
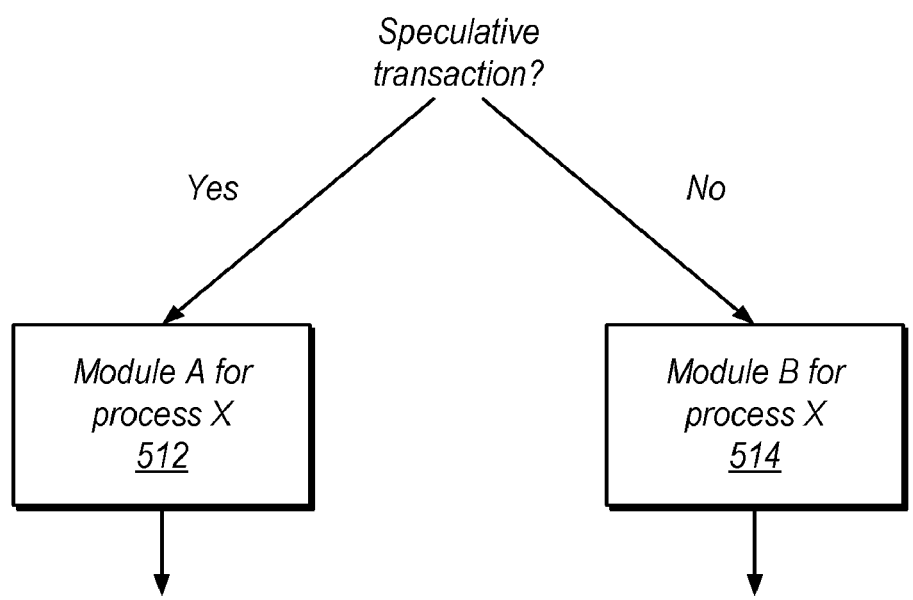
FIG. 5 is a block diagram illustrating exemplary separate modules for processing speculative and non-speculative transactions, according to some embodiments.

FIG. 5 is a block diagram illustrating exemplary separate modules for processing speculative and non-speculative transactions, according to some embodiments. In the illustrated embodiment, based on whether a transaction is being processed speculatively, the system uses either module A 512 or module B 514 to perform a process X. Said another way, different modules may be used to perform the same operation for speculative and non-speculative transactions. In other embodiments, modules may be selected based on predicted likelihood of a transaction actually occurring, priority, or some other parameter. In yet other embodiments, rather than selecting a different module for different types of transactions, an input parameter may be used to affect functionality of a module for different types of transactions.

In various embodiments, different modules/parameters may be used to process speculative and non-speculative transactions differently for various reasons. For example, the time available to perform an operation may be different. Operations for non-speculative transactions may have more strict duration, e.g., based on a service level agreement that specifies an interval between the user starting a transaction and displaying a payment screen. Speculative transactions may vary in the amount of time available between receiving a trigger and the transaction actually being initiated, but the duration may be longer, on average, than for speculative transactions. Therefore, in some embodiments, a more robust version of an operation may be performed for a speculative transaction, given the additional processing time. As another example, operations for a speculative transaction may use a greater or smaller amount of processing resources than for a non-speculative transaction. Note that the processing time and/or amount of processing resources used for a non-speculative transaction may also be determined based on its priority.

Examples of operations that may be performed speculatively for a transaction include, without limitations: risk assessment, fraud detection, data encryption, data retrieval, electronic communications with another system, generating an authorization decision (which may be contingent, e.g., on a user confirming to complete the transaction), retrieving loyalty card information, retrieving information for one or more gift cards and determining whether they correspond to an involved merchant, retrieving discounts and/or offers, etc. In some embodiments, fraud detection techniques may include: geolocation, velocity pattern analysis, address verification system (AVS), delivery address verification, computer finger printing technology, or black-list checking. In some embodiments, steps taken during risk assessment may include: identifying risk, evaluating control measures, recording findings, implementing control measures to eliminate/reduce risk, or generating a risk assessment report. Various operations may utilize artificial intelligence engines, e.g., to identify unusual transactions.

Example User Interfaces

Figure 6:
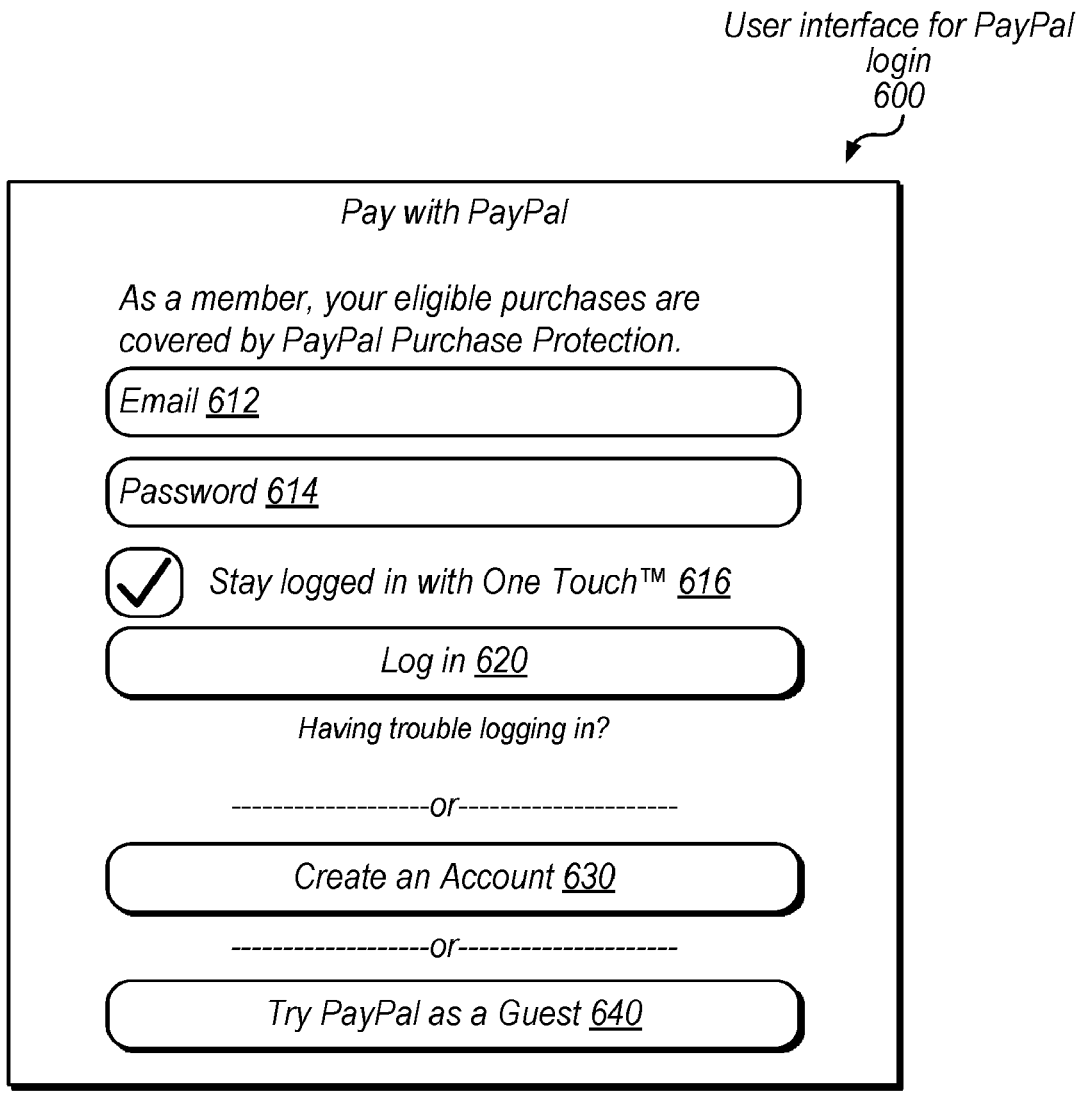
FIG. 6 is a diagram illustrating an exemplary user interface for signing in to a user transaction account that provides an option to remain signed in, according to some embodiments.

FIG. 6 is a diagram illustrating an exemplary user interface for s signing in to a user transaction account that provides an option to remain signed in, according to some embodiments. In the illustrated embodiment, interface 600 is provided by PayPal to allow a user to log in to a PayPal account. In some embodiments, interface 600 is displayed to the user when they initiate a transaction with or through PayPal.

In the illustrated example, a user with a previously created PayPal account enters email and password credentials using fields 612 and 614. Selection element 616, in the illustrated embodiment, allows the user to elect to stay logged into their PayPal account with One Touch technology for future transactions. In some embodiments, One Touch technology automatically authenticates the user for subsequent transactions using the same device, removing the need for the user to enter these credentials. As discussed above, enabling one-touch (or other similar authentication functionality) may facilitate speculative performance of at least a portion of a subsequent transaction.

Element 620, in the illustrated example, allows the user to confirm login to their PayPal account after entering credentials for their account. Element 630, in the illustrated embodiment, is selectable by the user to create an account with the service provider PayPal. In the illustrated embodiment, the user is also provided with an option to try PayPal as a guest by selecting element 640.

Figure 7:
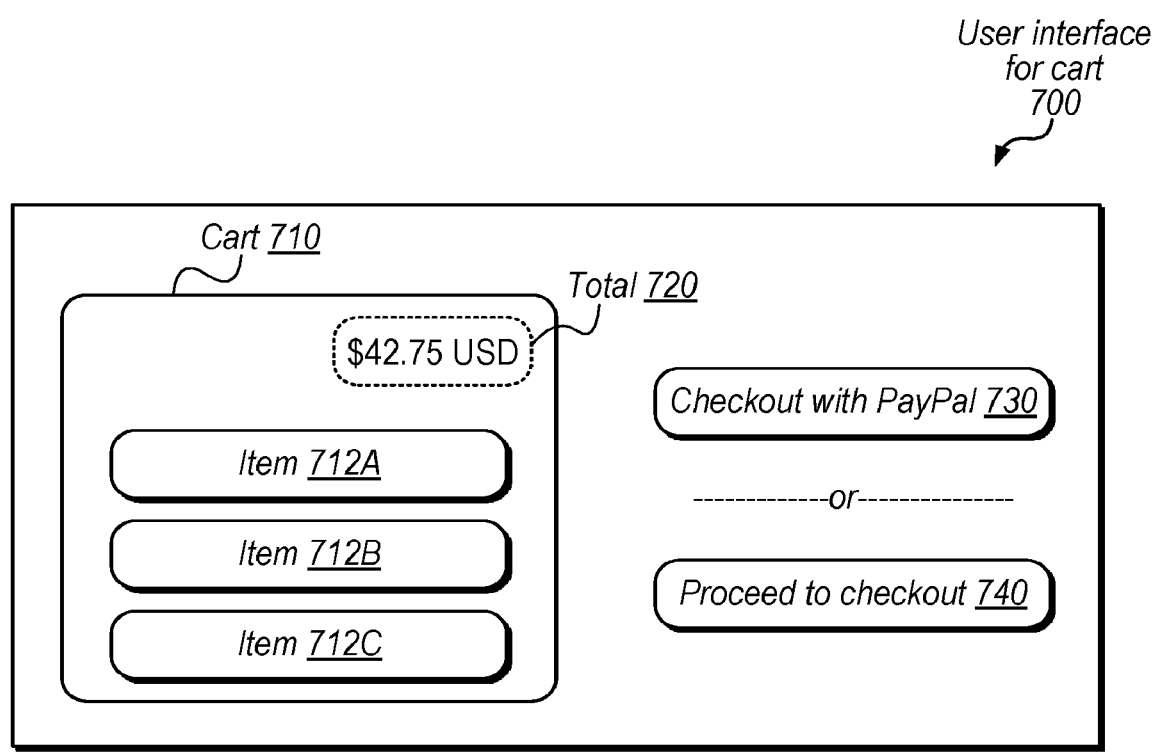
FIG. 7 is a diagram illustrating an exemplary user interface displaying a cart that includes an interface element, display of which may trigger speculative processing, according to some embodiments.

FIG. 7 is a diagram illustrating an exemplary user interface that displays a cart that includes an interface element, display of which may trigger speculative processing, according to some embodiments. In the illustrated embodiment, interface 700 is displayed to a user when the user requests to view their cart on a website or mobile application.

In the illustrated embodiment, the cart interface shows multiple items 712A-C and a total dollar amount. In some embodiments, items 712 may include descriptions and/or other details associated with the items. As shown, interface 700 also include options to proceed to checkout 740 (e.g., using a non-PayPal transaction) or to checkout with PayPal 730. As discussed above, loading of the "Checkout with PayPal" element 730 may trigger speculative processing.

Figure 8:
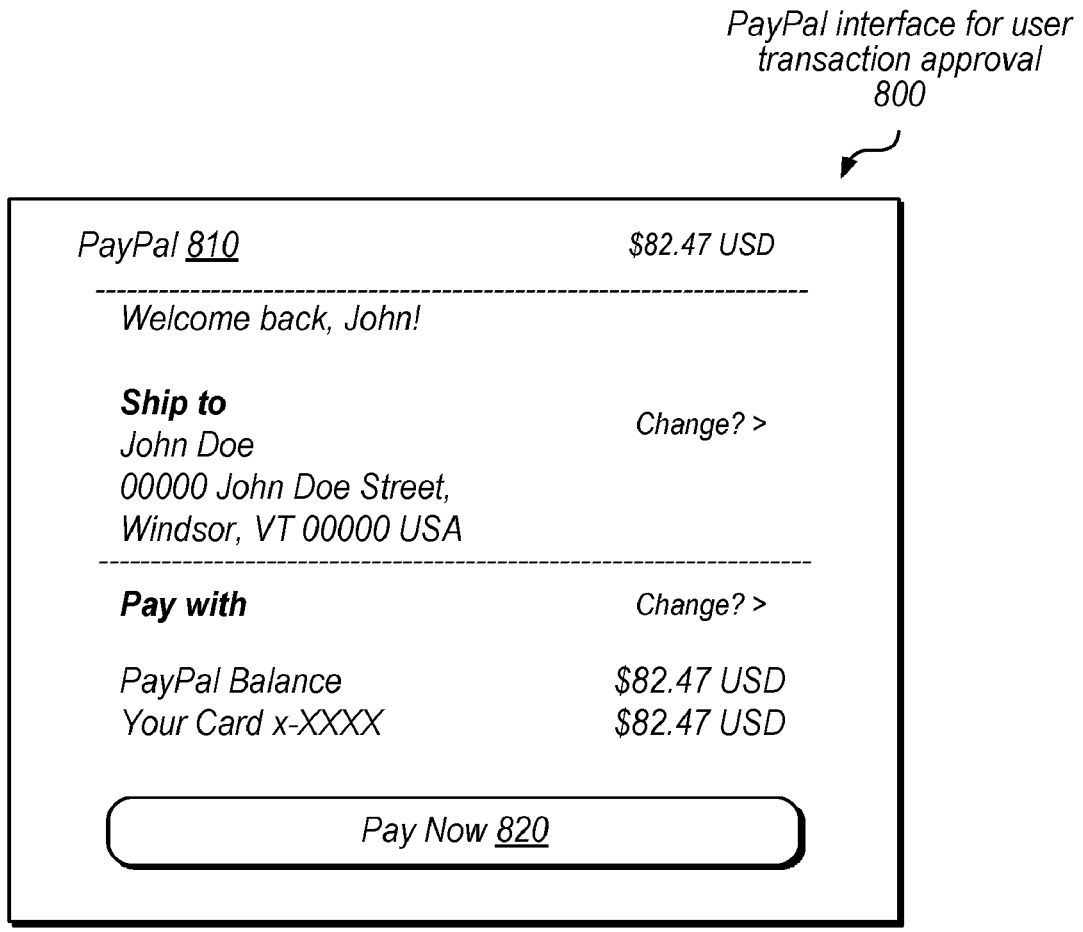
FIG. 8 is a diagram illustrating an exemplary interface for approval of a transaction that displays speculatively retrieved information, according to some embodiments.

In some embodiments, once the user has selected element 730, another interface, such as interface 800 discussed below with reference to FIG. 8, is displayed to the user. In embodiments where the user does not have a previously generated account with PayPal, a interface such as 600, discussed above with reference to FIG. 6, is displayed to the user allowing the user to create an account with PayPal after the user selects element 730.

FIG. 8 is a diagram illustrating an exemplary interface for approval of a transaction that displays speculatively retrieved information, according to some embodiments. In the illustrated embodiment, interface 810 is a user interface that is displayed in response to user selection of element 730, as discussed above with reference to FIG. 7. Interface 800 may be displayed with another interface such as interface 700 or may be displayed separately.

Interface 810, in the illustrated embodiment, displays various account information, including shipping and payment information for user John Doe. In the illustrated embodiment, the user is welcomed back to their account and prompted to confirm or change shipping information for a transaction. In the illustrated embodiment, the user is also prompted to confirm or change payment information for a transaction with a total amount of $82.47. In some embodiments, the user may be prompted to confirm and/or change more or less information than the shipping and payment information shown in interface 810.

Element 820, in the illustrated embodiment, provides the user with the option to authorize payment for the transaction. The user may also change retrieved account information, if needed. In some embodiments, in response to user selection of element 820, the transaction processing system proceeds with an authorization procedure and interface 900 may be displayed to the user, as discussed below.

Figure 9:
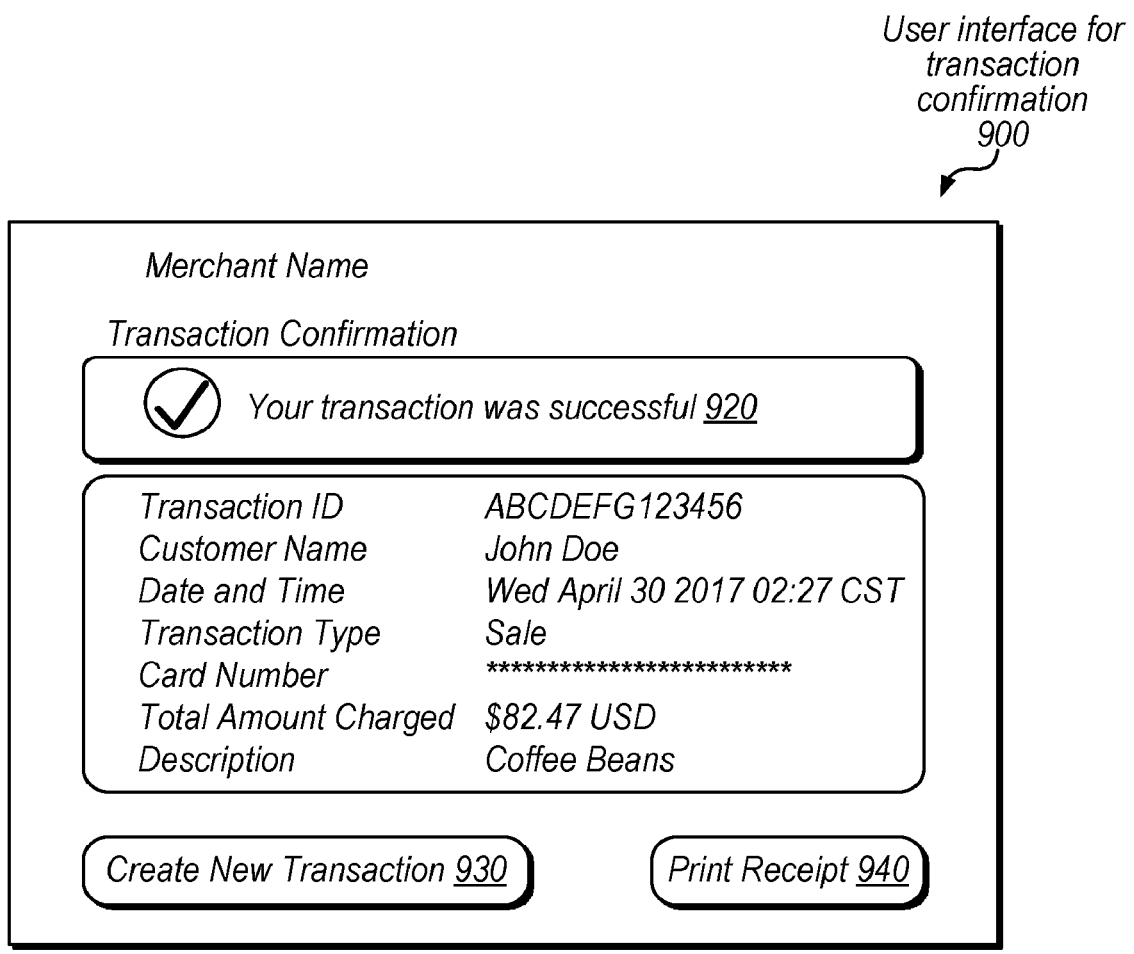
FIG. 9 is a diagram illustrating an exemplary user interface displaying a confirmation message for a completed transaction, according to some embodiments.

FIG. 9 is a diagram illustrating an exemplary user interface that displays a confirmation message for a completed transaction, according to some embodiments. In the illustrated embodiment, interface 900 displays a confirmation message to a user following completion of a transaction with a merchant.

In the illustrated embodiment, element 920 informs the user that their transaction was successful. In the illustrated embodiment, the interface shows a summary of various details associated with the successfully completed transaction. In the illustrated embodiment, these details include a transaction ID, customer name (e.g., the user), date and time of the transaction, transaction type, card number (e.g., a credit card associated with the users PayPal account), total amount charged, and a description of the item(s) purchased. Element 930, in the illustrated embodiment, provides the user with the option to create a new transaction. In the illustrated embodiment, element 940 allows the user to print a receipt for the successful transaction with one or more of the details displayed at interface 900. In some embodiments, another selectable button is displayed to the user allowing the user to cancel or alter the confirmed transaction.

In various embodiments, speculative transaction processing may advantageously reduce perceived processing time and/or improve transaction processing functionality. As one example, the time duration between the user selecting the "Checkout with PayPal" element of FIG. 7 and display of interface 800 may be reduced, e.g., by pre-retrieving account information. Based on additional preemptive operations, delay before display of interface 900 may also be reduced.

Exemplary Method

Figure 10:
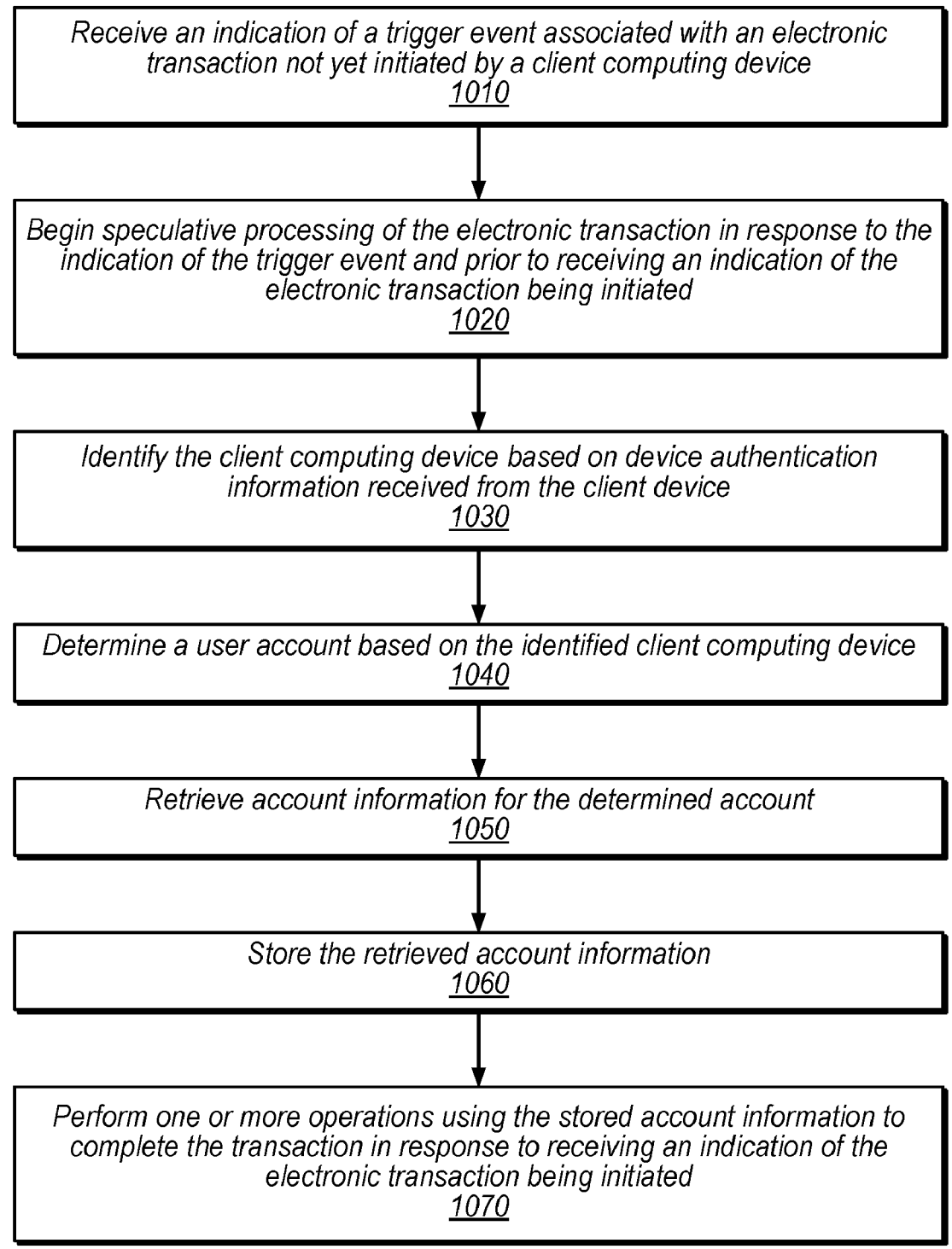
FIG. 10 is a flow diagram illustrating an exemplary method for speculatively performing operations for a transaction, according to some embodiments.

FIG. 10 is a flow diagram illustrating an exemplary method for speculatively performing operations for a transaction, according to some embodiments. The method shown in FIG. 10 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 1010, in the illustrated embodiment, a transaction processing server receives an indication of a trigger event associated with an electronic transaction not yet initiated by a client computing device. In some embodiments, the indication of the trigger event is a message associated with display of an interface element that is user-selectable to initiate the transaction. Speaking generally, in these embodiments the trigger event is an option provided to the user to allow initiation of the electronic transaction. In other embodiments, any of various appropriate trigger events may be communicated.

At 1020, in the illustrated embodiment, in response to the indication of the trigger event and prior to receiving an indication of the electronic transaction being initiated, the transaction processing server beginning speculative processing of the electronic transaction. Note that the electronic transaction may be part of a larger transaction that has already been initiated. For example, the electronic transaction may be a payment transaction (which has not been initiated) that is part of a purchase transaction that has been initiated.

In some embodiments, the speculative processing includes pre-authorizing at least a portion of the electronic transaction. In some embodiments, pre-authorizing at least a portion of the electronic transaction involves communication between the transaction processing server and another account of the user. For example, a PayPal server may communicate with another institution associated with the user account to perform pre-authorization. In some embodiments, pre-authorizing a transaction includes various different communications with one or more third parties associated with the user account.

In some embodiments, the transaction processing system predicts whether the trigger event will occur and determines whether to perform speculative processing based on the prediction. In some embodiments, the transaction processing system determines a priority for the speculative processing based on the determined prediction and performs the speculative processing based on the priority. In some embodiments, the predicting whether the trigger event will occur is based on one or more parameters including: a number of transactions initiated by the user account within a time interval, information indicating whether the user account performed the trigger event for one or more previous opportunities to perform the trigger event, or information indicating characteristics of interactions with a user interface that enables the trigger event.

In some embodiments, based on the determined priority, the transaction processing system sets cache retainment information for the stored account information. In some embodiments, the transaction processing system queues one or more transactions for processing based on the determined priority.

In some embodiments, the transaction processing system determines whether to perform speculative processing based on a monitored transaction level for the computing system, e.g., based on system congestion.

At 1030, in the illustrated embodiment, the transaction processing system performs speculative processing including identifying the client computing device based on device authentication information received from the client device. In some embodiments, the speculative processing includes invoking a security module to detect whether the transaction corresponds to a particular class of transaction (e.g., a risky transaction or a fraudulent transaction). In some embodiments, the speculative invocation of the security module uses at least one parameter that is different for the speculative invocation of the security module than for non-speculative invocations of the security module performed by the transaction processing system.

In some embodiments, speculative processing includes identifying a user account associated with the client device based on authentication information (e.g., a hardware identifier (ID) and a security token) received from the client device prior to the user performing the trigger event.

At, 1040-1060, in the illustrated embodiment, the transaction processing system performs speculative processing. At 1040, in the illustrated embodiment, the transaction processing system determines a user account based on the identified client computing device. At 1050, in the illustrated embodiment, the transaction processing system retrieves account information for the determined account. At 1060, in the illustrated embodiment, the transaction processing system stores the retrieved account information. In some embodiments, once the processing system has identified the user account, it retrieves account information and speculatively stores the information in a cache.

At 1070, in the illustrated embodiment, in response to receiving an indication of the electronic transaction being initiated, the transaction processing system performs one or more operations using the stored account information to complete the transaction. In some embodiments, once the user of the identified user account performs the trigger event provided by the client device, the processing system authorizes the transaction by performing one or more operations using the account information stored in the cache. In some embodiments, in order to complete the transaction, the processing system communicates with the client device to receive confirmation/approval from the user of the device for the transaction.

Example Computing Device

Figure 11:
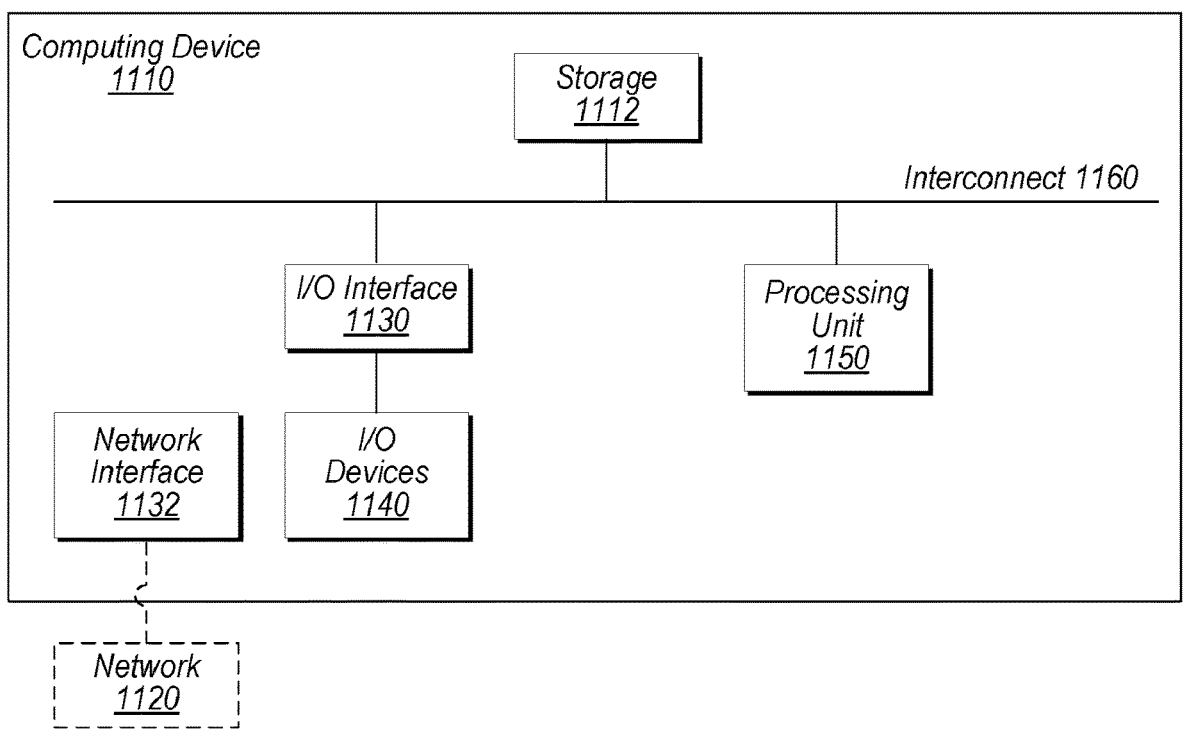
FIG. 11 is a block diagram illustrating an exemplary computing device, according to some embodiments.

Turning now to FIG. 11, a block diagram of one embodiment of computing device (which may also be referred to as a computing system) 1110 is depicted. Computing device 1110 may be used to implement various portions of this disclosure. Computing device 1110 may be any suitable type of device, including, but not limited to, a personal computer system, desktop computer, laptop or notebook computer, mainframe computer system, web server, workstation, or network computer. As shown, computing device 1110 includes processing unit 1150, storage 1112, and input/output (I/O) interface 1130 coupled via an interconnect 1160 (e.g., a system bus). I/O interface 1130 may be coupled to one or more I/O devices 1140. Computing device 1110 further includes network interface 1132, which may be coupled to network 1120 for communications with, for example, other computing devices.

In various embodiments, processing unit 1150 includes one or more processors. In some embodiments, processing unit 1150 includes one or more coprocessor units. In some embodiments, multiple instances of processing unit 1150 may be coupled to interconnect 1160. Processing unit 1150 (or each processor within 1150) may contain a cache or other form of on-board memory. In some embodiments, processing unit 1150 may be implemented as a general-purpose processing unit, and in other embodiments it may be implemented as a special purpose processing unit (e.g., an ASIC). In general, computing device 1110 is not limited to any particular type of processing unit or processor subsystem.

Storage subsystem 1112 is usable by processing unit 1150 (e.g., to store instructions executable by and data used by processing unit 1150). Storage subsystem 1112 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 1112 may consist solely of volatile memory, in one embodiment. Storage subsystem 1112 may store program instructions executable by computing device 1110 using processing unit 1150, including program instructions executable to cause computing device 1110 to implement the various techniques disclosed herein.

I/O interface 1130 may represent one or more interfaces and may be any of various types of interfaces configured to couple to and communicate with other devices, according to various embodiments. In one embodiment, I/O interface 1130 is a bridge chip from a front-side to one or more back-side buses. I/O interface 1130 may be coupled to one or more I/O devices 1140 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    prior to receiving an indication of an electronic transaction being initiated by a user of a client computing device:
        receiving, by a server system, an indication of a first user interface (UI) action taken with respect to a software user interface displayed on the client computing device, wherein the first UI action corresponds to at least one of a user mouse action of a first user or a user touchscreen action of the first user, wherein the software user interface is rendered via a program executing on the client computing device;
        predicting, by the server system based on at least the first UI action, an amount of time available between the first UI action and a time at which the user will initiate the electronic transaction within which to perform server-side pre-transaction processing operations;
        selecting, by the server system based on the predicted amount of time, a number and type of pre-transaction processing operations to be performed during server-side pre-transaction processing;
        responsive to the predicting, the selecting, and the indication of the first UI action taken with respect to the software user interface displayed on the client computing device, the server system performing server-side pre-transaction processing operations for the electronic transaction, wherein the electronic transaction is initiable via the software user interface but has not yet been initiated by the user, and wherein the server-side pre-transaction processing operations comprise:
            identifying a device identity of the client computing device using hardware identification information for the client computing device;
            determining a user account associated with the client computing device;
            identifying one or more items available for purchase corresponding to the software user interface, wherein the user has taken one or more UI actions with respect to the identified one or more items available for purchase;
            beginning an assessment of a risk of executing the electronic transaction prior to the user initiating the electronic transaction; and
        caching results of the server-side pre-transaction processing operations;
        subsequent to beginning the assessment of the risk, receiving, by the server system, an indication that the user has selected a UI element displayed via the software user interface, wherein user selection of the UI element initiates the electronic transaction; and
        approving or denying, by the server system, the electronic transaction based on retrieving the cached results of the server-side pre-transaction processing operations.

2. The method of claim 1, wherein identifying the device identity of the client computing device is based on a security token transmitted by the client computing device to the server system.

3. The method of claim 1, wherein the assessment of the risk is completed prior to the user initiating the electronic transaction.

4. The method of claim 1, wherein the software user interface comprises a website rendered by a web browser of the client computing device.

5. The method of claim 1, wherein the server-side pre-transaction processing operations for the electronic transaction further comprise:
    detecting a current geolocation of the client computing device; and
    determining, via an address verification system (AVS), whether the detected current geolocation matches a registered geolocation of a user associated with the client computing device.

6. The method of claim 1, further comprising:
    assigning a priority to the electronic transaction, wherein determining to begin the server-side pre-transaction processing operations for the electronic transaction is based on the assigned priority.

7. The method of claim 1, further comprising:
    determining an availability of system resources of the server system, wherein determining to begin the server-side pre-transaction processing operations for the electronic transaction is based on the availability of system resources.

8. The method of claim 7, wherein the availability of system resources includes an availability of computer processing resources for transaction processing.

9. The method of claim 1, wherein the assessment of the risk is completed subsequent to the user initiating the electronic transaction via the software user interface.

10. A server system, comprising:
    a processor; and
    a non-transitory computer-readable medium having stored thereon instructions that are executable to cause the server system to perform operations comprising:
        prior to receiving an indication of an electronic transaction being initiated by a user of a client computing device:
            receiving an indication of a first user interface (UI) action taken with respect to a software user interface displayed on the client computing device, wherein the first UI action corresponds to at least one of a user mouse action of a first user or a user touchscreen action of the first user, wherein the software user interface is rendered via a program executing on the client computing device;
            predicting, based on at least the first UI action, an amount of time available between the first UI action and a time at which the user will initiate the electronic transaction within which to perform server-side pre-transaction processing operations;
            selecting, based on the predicted amount of time, a number and type of pre-transaction processing operations to be performed during server-side pre-transaction processing;

responsive to the predicting, the selecting, and the indication of the first UI action taken with respect to the software user interface displayed on the client computing device, performing server-side pre-transaction processing operations for the electronic transaction, wherein the electronic transaction is initiable via the software user interface but has not yet been initiated by the user, and wherein the server-side pre-transaction processing operations comprise:
  identifying a device identity of the client computing device using hardware identification information for the client computing device;
  determining a user account associated with the client computing device;
  identifying one or more items available for purchase corresponding to the software user interface, wherein the user has taken one or more UI actions with respect to the identified one or more items available for purchase; and
  beginning an assessment of a risk of executing the electronic transaction prior to the user initiating the electronic transaction;
subsequent to beginning the assessment of the risk, receiving an indication that the user has selected a checkout UI element displayed via the software user interface, wherein user selection of the checkout UI element initiates the electronic transaction; and
approving or denying the electronic transaction based on a result of the assessment of the risk.

11. The system of claim 10, wherein the software user interface comprises a website rendered by a web browser of the client computing device.

12. The system of claim 10, wherein the server-side pre-transaction processing operations for the electronic transaction further comprise one or more of:
  data encryption corresponding to the electronic transaction, data retrieval corresponding to the electronic transaction, or generating a pre-authorization decision for the electronic transaction.

13. The system of claim 10, wherein the indication of the first UI action further includes a security token associated with the client computing device, and wherein identifying the device identity of the client computing device is further based on a security token.

14. The system of claim 10, wherein the server-side pre-transaction processing operations for the electronic transaction further comprise:
  detecting a current geolocation of the client computing device; and
  determining, via an address verification system (AVS), whether the detected current geolocation matches a registered geolocation of a user associated with the client computing device.

15. A non-transitory computer-readable medium having stored thereon instructions that are executable to cause a server system to perform operations comprising:
  prior to receiving an indication of an electronic transaction being initiated by a user of a client computing device:
    receiving an indication of a first user interface (UI) action taken with respect to a software user interface displayed on the client computing device, wherein the first UI action corresponds to at least one of a user mouse action of a first user or a user touchscreen action of the first user, wherein the software user interface is rendered via a program executing on the client computing device;
    predicting, based on at least the first UI action, an amount of time available between the first UI action and a time at which the user will initiate the electronic transaction within which to perform server-side pre-transaction processing operations;
    selecting, based on the predicted amount of time, a number and type of pre-transaction processing operations to be performed during server-side pre-transaction processing;
    responsive to the predicting, the selecting, and the indication of the first UI action taken with respect to the software user interface displayed on the client computing device, performing server-side pre-transaction processing operations for the electronic transaction, wherein the electronic transaction is initiable via the software user interface but has not yet been initiated by the user, and wherein the server-side pre-transaction processing operations comprise:
      identifying a device identity of the client computing device using hardware identification information for the client computing device;
      determining a user account associated with the client computing device;
      identifying one or more items available for purchase corresponding to the software user interface, wherein the user has taken one or more UI actions with respect to the identified one or more items available for purchase; and
      beginning an assessment of a risk of executing the electronic transaction prior to the user initiating the electronic transaction;
  subsequent to beginning the assessment of the risk, receiving an indication that the user has selected a UI element displayed via the software user interface, wherein user selection of the UI element initiates the electronic transaction; and
  approving or denying the electronic transaction based on a result of the assessment of the risk.

16. The non-transitory computer-readable medium of claim 15, wherein the operations further comprise:
  assigning a priority to the electronic transaction, wherein determining to begin the server-side pre-transaction processing operations for the electronic transaction is based on the assigned priority.

17. The non-transitory computer-readable medium of claim 15, wherein the operations further comprise:
  determining an availability of system resources of the server system, wherein determining to begin the server-side pre-transaction processing operations for the electronic transaction is based on the availability of system resources.

18. The non-transitory computer-readable medium of claim 15, wherein the one or more UI actions taken with respect to the identified one or more items available for purchase include the user adding the one or more items to an online shopping cart corresponding to the software user interface.

19. The non-transitory computer-readable medium of claim 15, wherein determining to begin the server-side pre-transaction processing operations for the electronic transaction is based on historical account information for the user, wherein the historical account information includes information regarding a plurality of previous transactions engaged in by the user account, wherein the user account corresponds to an electronic transaction processing service.

20. The non-transitory computer-readable medium of claim 15, wherein the server-side pre-transaction processing operations for the electronic transaction further comprise:
   detecting a current geolocation of the client computing device; and
   determining, via an address verification system (AVS), whether the detected current geolocation matches a registered geolocation of a user associated with the client computing device.

* * * * *